Sept. 28, 1926.
C. V. PEREDA
1,601,039
MULTIPLE DRILLING AND FERTILIZING MACHINE
Filed Jan. 30, 1924    2 Sheets-Sheet 1
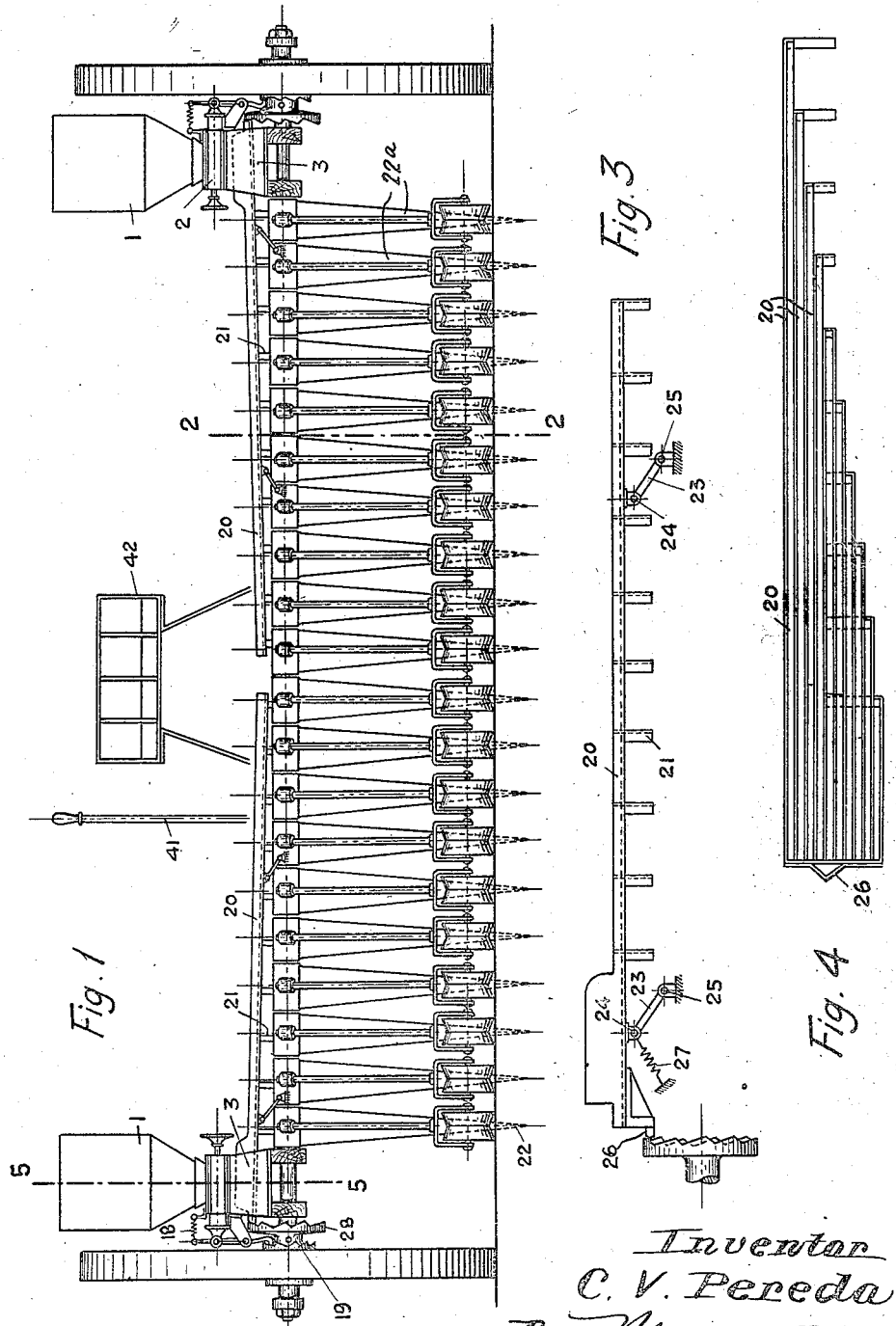

Sept. 28, 1926.
C. V. PEREDA
1,601,039
MULTIPLE DRILLING AND FERTILIZING MACHINE
Filed Jan. 30, 1924    2 Sheets-Sheet 2
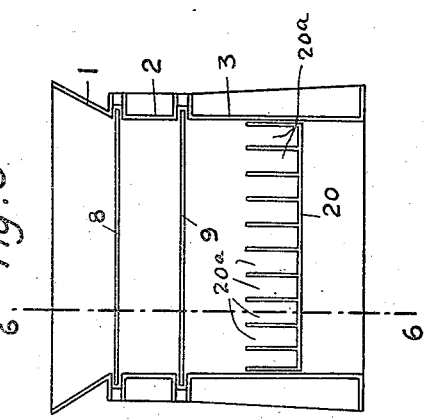
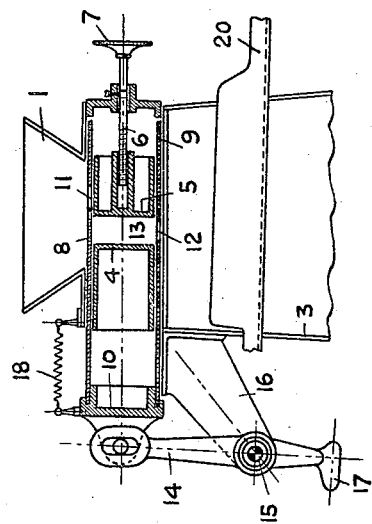
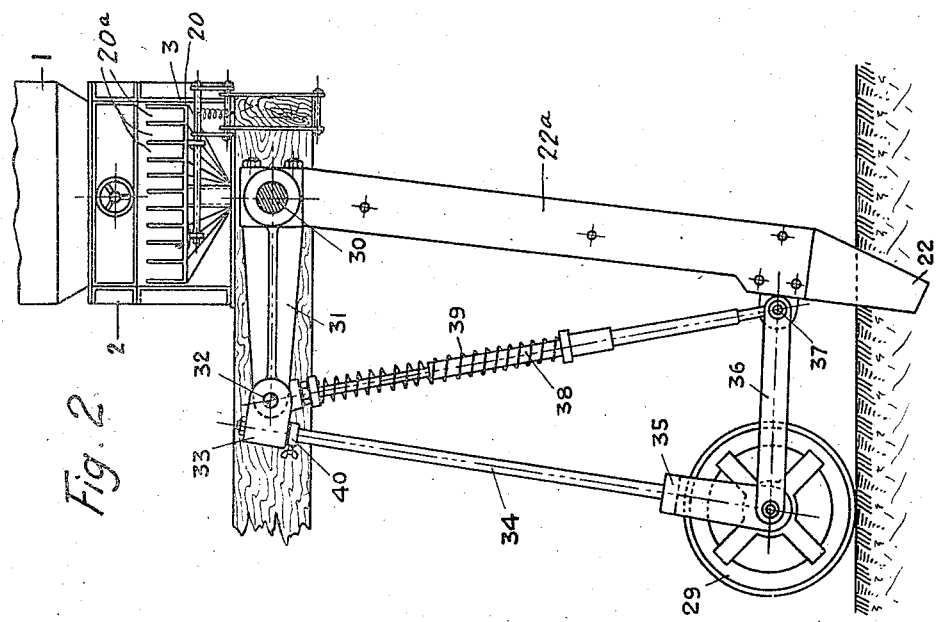
Inventor
C. V. Pereda
By Marks Clark
Attys Patented Sept. 28, 1926.

1,601,039

UNITED STATES PATENT OFFICE.

CELEDONIO VICENTE PEREDA, OF BUENOS AIRES, ARGENTINA.

MULTIPLE DRILLING AND FERTILIZING MACHINE.

Application filed January 30, 1924, Serial No. 689,502, and in Great Britain March 17, 1923.

The invention relates to an agricultural machine for drilling seeds or fertilizer or a mixture of both, and comprises multiple distributing means and means for measuring the materials as well as for feeding the same uniformly to the single drills of the machine.

The invention also relates to means for regulating the depth at which the different kinds of seeds must be placed and to plant the seeds at the proper depth regardless of the unevennesses of the ground.

The invention also relates to means for regulating the depth of the different drills, so that each drill can be regulated independently of the others.

According to the invention, the material to be drilled or distributed drops intermittently in measured quantities from two hoppers, arranged one on either end of the machine, upon two oscillating tables which extend from the two hoppers to the middle of the machine, these tables having the same number of grooves as there are drills on the machine, and each groove communicating with a small tube which conducts the seed or fertilizer to a point behind the corresponding drill.

The invention is illustrated by way of example in the accompanying drawings, in which:—

Figure 1 is a rear elevation of the improved drilling and fertilizing machine.

Fig. 2 is a vertical section taken on the line 2—2 of Figure 1.

Figs. 3 and 4 are a side view and a plan view respectively of the feeding table.

Fig. 5 is a section taken on the line 5—5 of Figure 1, and Fig. 6 is a section taken on the line 6—6 of Fig. 5.

In these figures, 1 is a hopper to receive the material to be drilled, and 2 is the casing of a measuring device. The hopper and measuring device are carried by supports 3. The measuring device is provided with a fixed wall 4 at or near the center line of the hopper cooperating with an adjustable wall 5 to form a measuring compartment 13. The wall 5 can be moved by a screwed spindle 6 that passes through the inner end of the casing 2 and terminates in a handwheel 7. By rotating the hand wheel 7, the size of the measuring compartment 13 can be regulated.
A series of graduation marks may be placed upon the outer wall of the measuring receiver together with an indicator on the handwheel, to aid the operator to read by the graduations the volume of the measuring receiver with reference to the position of the hand wheel and to determine the quantity of seed to be employed for a determined piece of ground to be drilled and fertilized. Arranged respectively above and below the members 4 and 5, are two parallel plates 8 and 9, forming a slide valve, and these plates are fastened to a member 10. The upper plate 8 has an opening 11 and the lower plate an opening 12, which openings are out of vertical alignment, so that during reciprocation of the plates, the openings successively register with the compartment 13, whereby material is first admitted to said compartment through the aperture 11 and subsequently discharged through the aperture 12. Each of the members 10 is connected to one end of a double-armed lever 14, which is fulcrumed at 15, upon a bracket 16 fastened on one of the supports 3. The lever 14 carries a tooth 17 which is kept by the spiral spring 18 in contact with a circular cam of an actuating member 19 fastened to the wheel of the machine, so that at the rotation of the wheel, the cam effects intermittent movement of the tooth and therewith the plates 8 and 9 in one direction, causing a determined quantity of seed to drop from the hopper into the measuring space 13, in which the seed will remain until the cam ceases to influence the tooth 17 and the plates 8 and 9 are moved in the opposite direction by the spring 18. At this time the seed in compartment 13 will drop through aperture 12 onto a transporting table 20. The transporting table extends between the supports 3 and is of the same width as the measuring space 13. The table, as best shown in Figs. 4 and 5, is provided on its upper side with as many grooves 20$^a$ as there are drills to be fed, so that the same quantity of material is fed to each drill. Every machine has two feeding devices and two transporting tables. The grooves conduct the seed to small tubes 21 which discharge into members 22$^a$ having drills 22 at their lower ends. To permit this, the length of the groves gradually diminishes from the centre of the machine towards the outside. Each table is supported by two arms 23 which are both connected at 24 to the table and at 25 to the frame of the machine.

In order to oscillate the table, the latter is provided with a tooth 26 which is constantly pressed by a spiral spring 27 against the circular corrugated face of an actuating member 28 fastened to and coaxially arranged with the wheel of the machine, so that at the rotation of the wheel, the cam intermittently moves the tooth 26 and imparts to the table an oscillating movement around the fulcrums 25. The table at each oscillation also receives a certain inclination. Due to this, the seed or fertilizing material at each oscillation is advanced progressively in the grooves of the table until the seed reaches the vertical tubes 21 which conduct the material behind the drill members 22ª.

Rollers 29 serve to cover the seed and compress the ground above the seed laid in the furrow. The drill members 22ª are made of bent sheet metal and are loosely mounted on the fixed machine shaft 30. A lever 31 is rigidly connected with the machine shaft 30, and is provided at its free end with a pivot 32 for another lever 33. The lever 33 receives one end of the adjustable rod 34, the other end of which is connected by a fork 35 with the roller 29. A radius rod 36 is pivoted at one end 37 upon the drill member 22ª and at its other end to the fork 35. A telescopic connecting rod 38 is surrounded by a spiral spring 39 and connects the joints 32 and 37.

By this system of levers, it is possible if there is an unevenness of the ground which tends to lift any of the rollers 29, for the roller to move backward and thereby rotate around the fulcrum 32, pulling with it to a certain extent the drill 22. In this rotation, the depth of the furrow of the drill remains about the same as before the rotation has taken place. The spring 39 becomes compressed and then so acts upon the drill, that on account of the connecting rod 36 the drill cannot penetrate further into the ground until the roller 29 has again dropped. The depth of the furrows can be regulated by lengthening or shortening the rods 34 upon the levers 33, the rods 34 in every position being locked to the levers 33 by the locking rings 40. A lever 41 is fixed to the shaft 30, and can be actuated by the operator of the machine from the seat 42, in order to raise the levers 31 and thereby lift the drills 22 from the ground when discontinuing operation.

What I claim is:—

A multiple drilling and fertilizer machine comprising a frame, hoppers mounted at each end of said frame, two oscillating transporting tables extending from the ends of the frame to the center thereof, each table extending beneath one of the hoppers and being provided with a number of grooves successively decreasing in length toward the center, measuring means between each hopper and the table beneath the same, means for actuating the measuring means to cause the same to intermittently deposit material from the hopper into the grooves of the table beneath, and drilling tubes arranged to receive material discharged from the grooves.

In testimony whereof I have signed my name to this specification.

CELEDONIO VICENTE PEREDA.